(12) United States Patent
Tobin et al.

(10) Patent No.: US 8,956,115 B2
(45) Date of Patent: Feb. 17, 2015

(54) BLADE EXTENSION AND ROTOR BLADE ASSEMBLY FOR WIND TURBINE

(75) Inventors: James Robert Tobin, Simpsonville, SC (US); Aaron John Mashue, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 511 days.

(21) Appl. No.: 13/354,444

(22) Filed: Jan. 20, 2012

(65) Prior Publication Data

US 2013/0189103 A1 Jul. 25, 2013

(51) Int. Cl.
*F03D 1/06* (2006.01)
*B23P 15/02* (2006.01)

(52) U.S. Cl.
USPC ............ 416/62; 416/87; 416/214 R; 416/226; 416/239; 416/248

(58) Field of Classification Search
CPC ..... Y02E 10/721; F03D 1/0658; F03D 1/001; F03D 1/06; F05B 2260/301
USPC ...... 416/62, 87, 204 A, 204 R, 210 R, 214 R, 416/226, 239, 241 R, 248
See application file for complete search history.

(56) References Cited

U.S. PATENT DOCUMENTS

| | | | |
|---|---|---|---|
| 2,427,166 A | 9/1947 | Teeter | |
| 2,718,267 A * | 9/1955 | Woolf et al. | 416/239 |
| 5,342,004 A | 8/1994 | Bobbitt | |
| 2009/0068017 A1 | 3/2009 | Rudling | |
| 2010/0135811 A1 * | 6/2010 | Kirtley et al. | 416/219 R |
| 2010/0158661 A1 * | 6/2010 | Dawson et al. | 415/4.3 |
| 2010/0290912 A1 * | 11/2010 | Sorensen | 416/204 R |
| 2011/0020128 A1 | 1/2011 | Fuglsang et al. | |
| 2011/0142636 A1 * | 6/2011 | Curtin | 416/62 |

FOREIGN PATENT DOCUMENTS

| | | |
|---|---|---|
| EP | 1950414 A2 | 7/2008 |
| EP | 1995412 | 11/2008 |
| EP | 2031242 | 3/2009 |
| EP | 2078851 A1 | 7/2009 |
| EP | 2107235 | 10/2009 |
| GB | 2462307 A | 2/2010 |
| WO | 2010/133649 | 11/2010 |

OTHER PUBLICATIONS

Search Report and Written Opinion for corresponding PCT Application No. PCT/US2013/022514, dated May 7, 2013.

* cited by examiner

*Primary Examiner* — Igor Kershteyn
(74) *Attorney, Agent, or Firm* — Dority & Manning, P.A.

(57) ABSTRACT

A rotor blade assembly for a wind turbine, and a method for installing a rotor blade assembly on a wind turbine, are disclosed. The rotor blade assembly includes a rotor blade having exterior surfaces defining an aerodynamic profile including a pressure side and a suction side extending between a leading edge and a trailing edge. The rotor blade further extends in a generally span-wise direction between a root and a tip. The rotor blade assembly further includes a blade extension extending in the generally span-wise direction from the root towards the tip, and a plurality of connection devices connecting the blade extension to the rotor blade. Each of the plurality of connection devices includes a mechanical fastener extending through the root in the generally span-wise direction for connecting the rotor blade to a hub of the wind turbine.

20 Claims, 4 Drawing Sheets

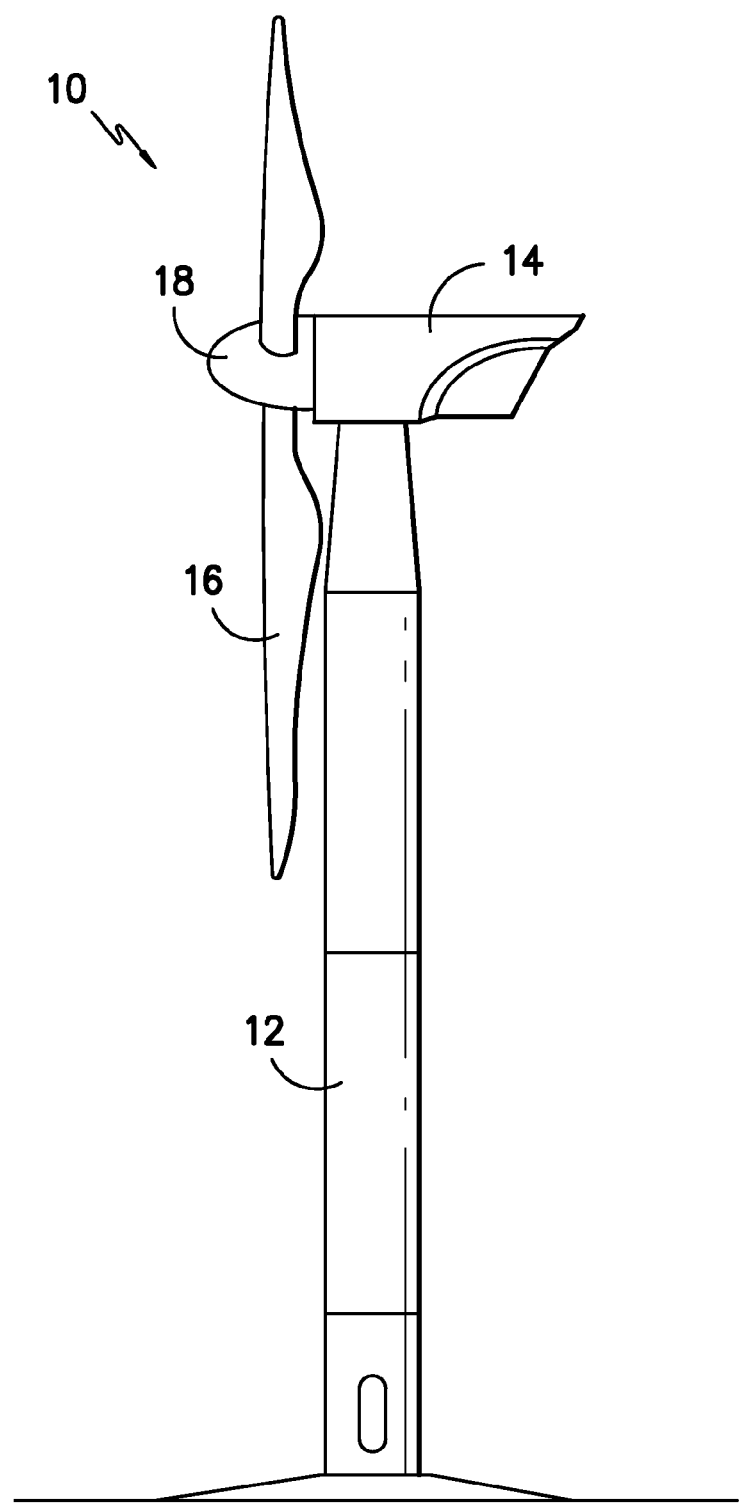
FIG. -1-

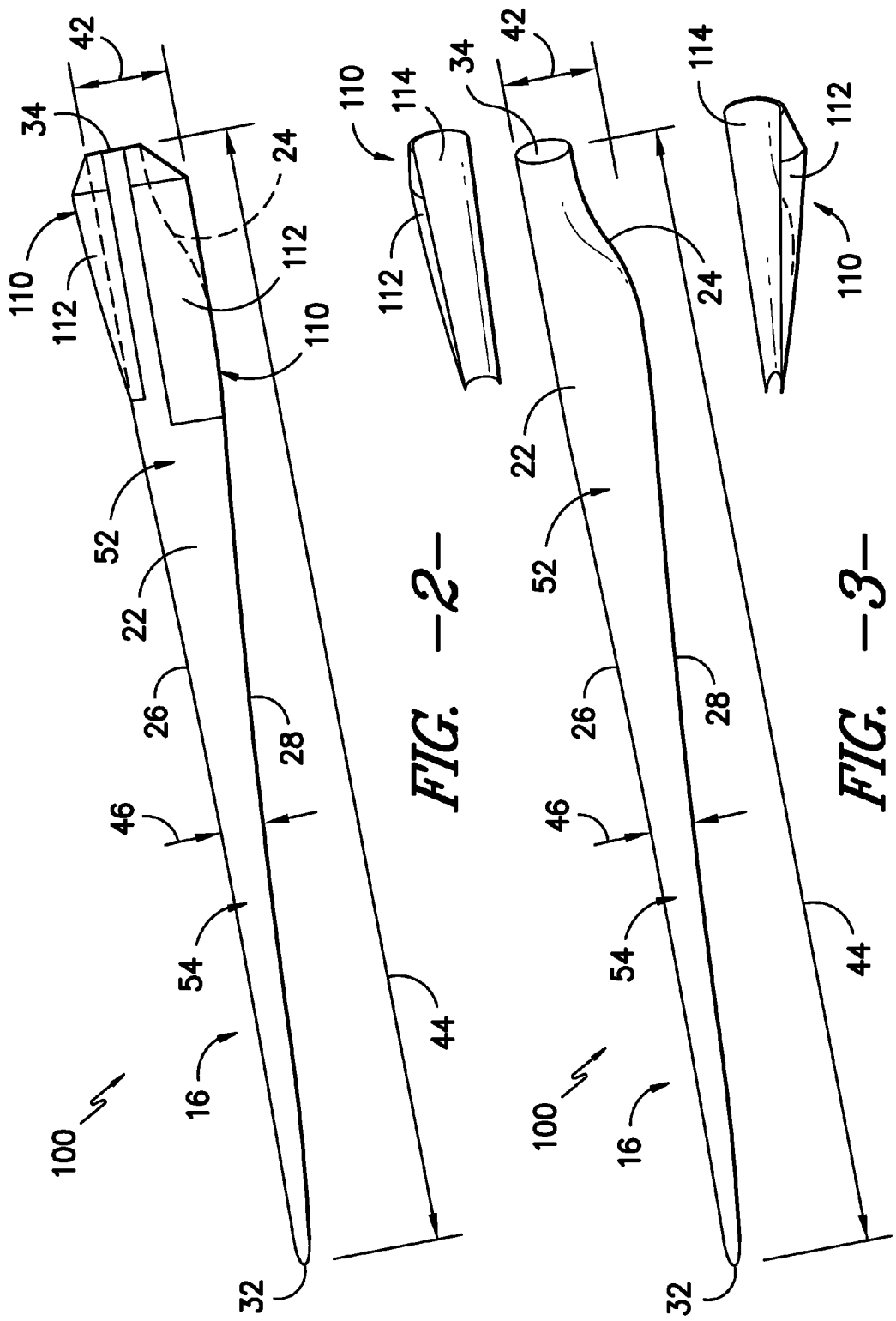

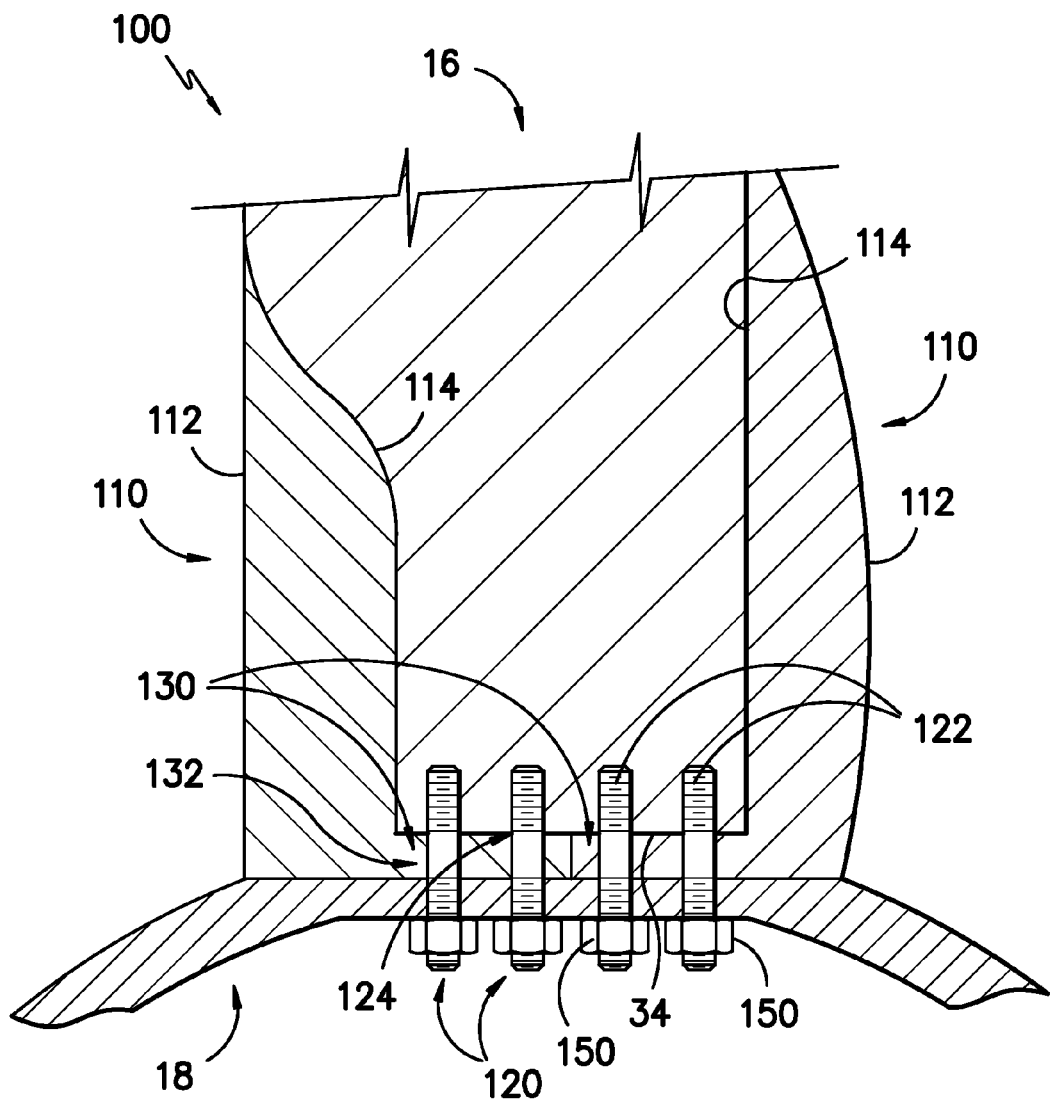
FIG. -4-

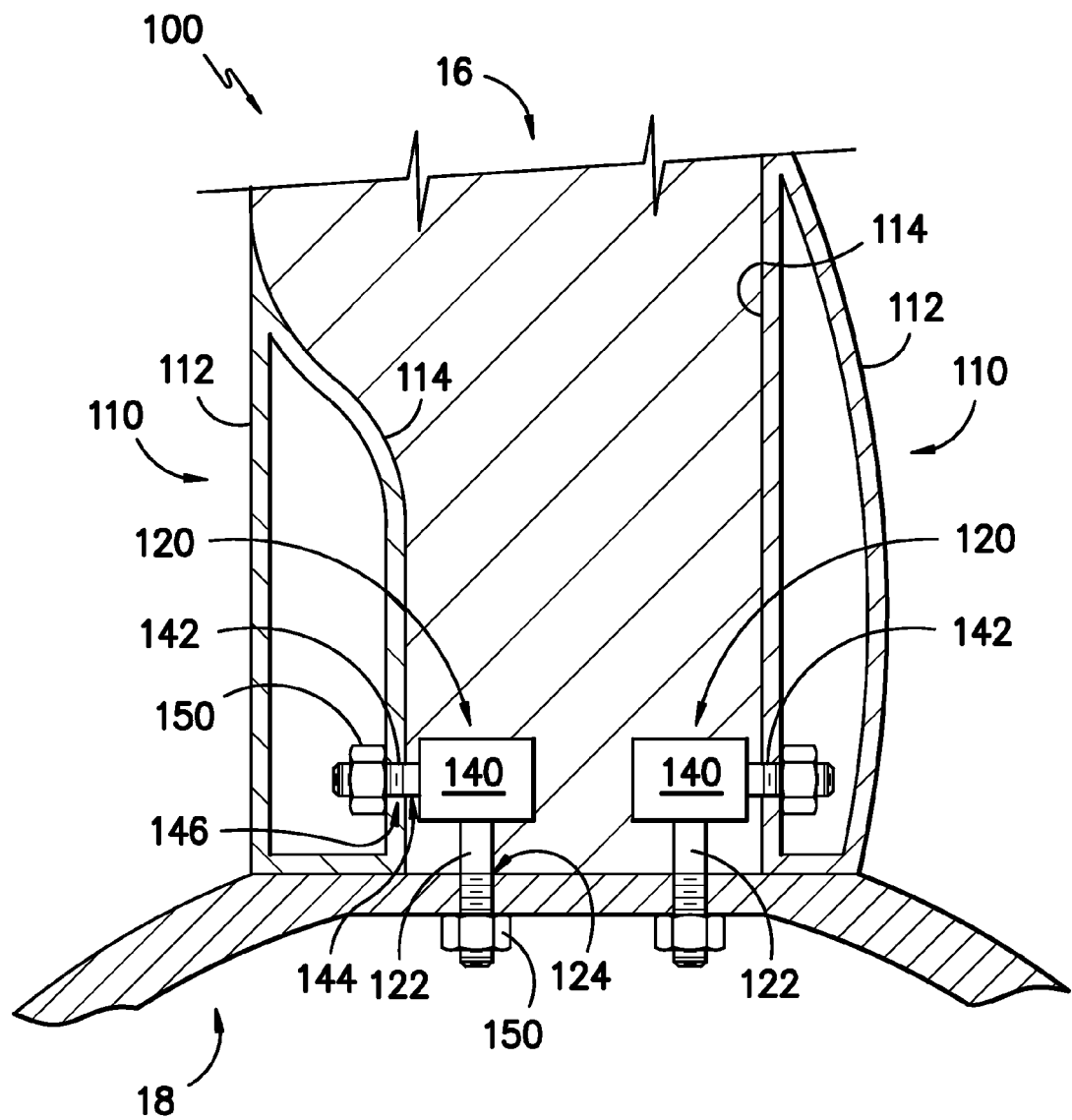
FIG. -5-

BLADE EXTENSION AND ROTOR BLADE ASSEMBLY FOR WIND TURBINE

FIELD OF THE INVENTION

The present disclosure relates in general to wind turbine rotor blades, and more particularly to blade extensions for the rotor blades and rotor blade assemblies formed therefrom.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Present wind turbine technology has led to the development of flaps and/or other suitable extensions which may be fitted to rotor blades. The extensions are typically attached to the rotor blades to increase the rotor blade surface area and thus increase the lift. However, the attachment of such extensions to rotor blades has become increasingly difficult, particularly due to current developments leading to increases in the size of rotor blades and wind turbines. For example, if adhesives are utilized to attach an extension to a rotor blade, the adhesive bond must be continuously monitored. Further, errors in the application of an adhesive are difficult to correct.

Presently known extensions have also been attached to rotor blades using mechanical fasteners, such as rivets, screws, or bolts. However, previous attempts to attach an extension to a rotor blade using a mechanical fastener require forming new holes in the rotor blade that are in addition to and separate from existing holes that are formed for joining the rotor blade to the wind turbine. The formation of these holes creates stress concentrations in the rotor blade, and can disrupt the aerodynamic contour of the rotor blade. Thus, currently known attachment methods and apparatus have a negative impact on the performance of the rotor blade and wind turbine.

Accordingly, an improved rotor blade assembly would be advantageous. For example, a rotor blade assembly that includes improved apparatus for connecting a blade extension thereto would be desired in the art. In particular, a rotor blade assembly that includes connecting apparatus that utilize existing rotor blade hardware and holes would be advantageous.

BRIEF DESCRIPTION OF THE INVENTION

Aspects and advantages of the invention will be set forth in part in the following description, or may be obvious from the description, or may be learned through practice of the invention.

In one embodiment, a rotor blade assembly for a wind turbine is disclosed. The rotor blade assembly includes a rotor blade having exterior surfaces defining an aerodynamic profile including a pressure side and a suction side extending between a leading edge and a trailing edge. The rotor blade further extends in a generally span-wise direction between a root and a tip. The rotor blade assembly further includes a blade extension extending in the generally span-wise direction from the root towards the tip, and a plurality of connection devices connecting the blade extension to the rotor blade. Each of the plurality of connection devices includes a mechanical fastener extending through the root in the generally span-wise direction for connecting the rotor blade to a hub of the wind turbine.

In another embodiment, a method of installing a rotor blade assembly on a wind turbine is disclosed. The method includes connecting a blade extension to a rotor blade. The rotor blade extends in a generally span-wise direction between a root and a tip. A plurality of connection devices are utilized to connect the blade extension to the rotor blade. Each of the plurality of connection devices includes a mechanical fastener configured to extend through the root in the generally span-wise direction. The mechanical fastener connects the rotor blade to a hub of the wind turbine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side view of a wind turbine according to one embodiment of the present disclosure;

FIG. 2 is a bottom view of a rotor blade assembly according to one embodiment of the present disclosure;

FIG. 3 is an exploded bottom view of a rotor blade assembly according to one embodiment of the present disclosure;

FIG. 4 is a cross-sectional view of a root portion of a rotor blade assembly according to one embodiment of the present disclosure; and, FIG. 5 is a cross-sectional view of a root portion of a rotor blade assembly according to another embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A rotor is further mounted on the tower 12. The rotor includes a plurality of rotor blades 16 connected to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIGS. 2 and 3, a rotor blade 16 according to the present disclosure may include exterior surfaces defining a pressure side 22, a suction side 24, a leading edge 26, and a trailing edge 28. The pressure side 22 and suction side 24 may each extend between the leading edge 26 and the trailing edge 28. The exterior surfaces may extend between a blade tip 32 and a blade root 34 in a generally span-wise direction, as discussed below.

The pressure side 22, suction side 24, leading edge 26 and trailing edge 28 may be generally aerodynamic surfaces having generally aerodynamic contours, as is generally known in the art. Thus, the exterior surfaces of the rotor blade 16 may define an aerodynamic profile, such as an airfoil-like cross-sectional profile, for the rotor blade 16. The aerodynamic profile includes the pressure side 22, suction side 24, leading edge 26 and trailing edge 28.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define a chord 42 and a span 44 extending in chord-wise and span-wise directions, respectively. As shown in FIGS. 2 and 3, the chord 42 may vary throughout the span 44 of the rotor blade 16. Thus, as discussed below, a local chord 46 may be defined for the rotor blade 16 at any point on the rotor blade 16 along the span 44.

Additionally, the rotor blade 16 may define an inner board area 52 and an outer board area 54. The inner board area 52 may be a span-wise portion of the rotor blade 16 extending from the root 34. For example, the inner board area 52 may, in some embodiments, include approximately 33%, 40%, 50%, 60%, 67%, or any percentage or range of percentages therebetween, or any other suitable percentage or range of percentages, of the span 44 from the root 34. The outer board area 54 may be a span-wise portion of the rotor blade 16 extending from the tip 32, and may in some embodiments include the remaining portion of the rotor blade 16 between the inner board area 52 and the tip 32. Additionally or alternatively, the outer board area 54 may, in some embodiments, include approximately 33%, 40%, 50%, 60%, 67%, or any percentage or range of percentages therebetween, or any other suitable percentage or range of percentages, of the span 44 from the tip 32.

As illustrated in FIGS. 2 through 5, the present disclosure may further be directed to a rotor blade assembly 100. A rotor blade assembly 100 according to the present disclosure may include a rotor blade 16 and one or more blade extensions 110. A blade extension 110 according to the present disclosure generally increases the surface area of the rotor blade 16. Such an increase may thus increase the lift of the rotor blade 16. A blade extension 110 extends in the generally span-wise direction through a portion of the span 44 of the rotor blade 16. Further, in exemplary embodiments, a blade extension 110 may extend from the root 34 towards the tip 32. A blade extension 110 may thus extend in the span-wise direction through all or any portion of the inner board area 52, and in some embodiments may further extend through all or any portion of the outer board area 54.

By extending from the root 34 towards the tip 32, a portion of the blade extension 110 may provide an aerodynamic contour to the portion of the rotor blade 16 including the root 34 that does not have an aerodynamic contour. For example, the portion of the rotor blade 16 proximate to and including the root 34 may have a generally circular or oval shaped cross-sectional profile, or any other suitable polygonal non-aerodynamic shaped profile. Thus, lift at this portion of the rotor blade 16 is reduced and drag is increased, which can diminish the performance of the rotor blade 16. However, by connecting a blade extension 110 to the rotor blade 16, at least a portion of this non-aerodynamic profiled portion of the rotor blade 16 from the root 34 can be modified by the blade extension 110 to have an aerodynamic contour.

Thus, in exemplary embodiments, an exterior surface 112 of the blade extension 110 may have an aerodynamic contour. The aerodynamic contour may further correspond to the aerodynamic profile of the rotor blade 16. This correspondence may advantageously provide a generally smooth transition between the aerodynamic contour of the blade extension 110 and the aerodynamic profile of rotor blade 16.

As discussed, the exterior surface 112 of the blade extension 110 may have an aerodynamic contour that corresponds to the aerodynamic profile of the rotor blade 16. Thus, the exterior surface 112 may further define any one or more of the exterior surfaces of the rotor blade 16. For example, in some embodiments, the exterior surface 112 may further define the leading edge 26 or the trailing edge 28. Further, in some embodiments, more than one blade extension 110 may be connected to the rotor blade 16. For example, as shown in FIGS. 2 through 5, two blade extensions 110 may be connected to the rotor blade 16. One of the blade extensions 110 may further define the leading edge 26, while the other blade extension further defines the trailing edge 28. Additionally, a blade extension 110 according to the present disclosure may further define the pressure side 22 and/or the suction side 24, or any portions thereof.

As shown in FIG. 3, a blade extension 110 may further include an interior surface 114. When the blade extension 110 is connected to the rotor blade 16, the interior surface 114, or any portion thereof, may in some embodiments contact one or more exterior surfaces of the rotor blade 16. Further, in exemplary embodiments as shown, the interior surface 114, such as the contour thereof, may correspond to one or more exterior surfaces of the rotor blade 16, such that the interior surface 114 and those exterior surfaces are generally in contact throughout the interior surface 114.

In some embodiments, as shown in FIG. 5, a blade extension 110 according to the present disclosure or any portion thereof may be hollow, thus defining an interior generally between the exterior surface 112 and interior surface 114. In other embodiments, as shown in FIG. 4, a blade extension according to the present disclosure or any portion thereof may be solid, such that no interior is defined between the exterior surface 112 and interior surface 114.

As shown in FIGS. 4 and 5, a rotor blade assembly 100 according to present disclosure may further include a plurality of connection devices 120. Each connection device 120 connects the blade extension 110 to the rotor blade 16. Further, each connection device 120 according to the present disclosure utilizes pre-existing holes in the rotor blade 16, extending through these pre-existing holes to connect the blade extension 110 to the rotor blade 16. Thus, connection devices 120 according to the present disclosure allow blade extensions 110 to be connected to rotor blades 16 without creating additional stress concentrations in the rotor blades 16, and without disrupting the aerodynamic contours of the rotor blades 16. Further, such connection devices 120 allow for blade extensions 110 to be quickly and easily connected to rotor blades 16 after the rotor blades 16 and rotor are mounted on the tower 12 of the wind turbine 10. For example, a blade extension 110 according to the present disclosure could be retrofitted to a rotor blade 16 on an existing wind turbine 10. Such retrofitting or otherwise connecting after the rotor is mounted on the tower 12 can advantageously be performed without drilling additional holes in the rotor blade 16.

The connection devices 120 according to the present disclosure may have any suitable arrangement. For example, in exemplary embodiments, the connection devices 120 may be arranged in an annular array. Thus, mechanical fasteners included in the connection devices 120 and holes defined by the connection devices 120, as discussed below, may be arranged in annular arrays.

As shown in FIGS. 4 and 5, each connection device 120 according to the present disclosure includes a mechanical fastener 122. A mechanical fastener 122 in exemplary embodiments is a bolt. Alternatively, however, a mechanical fastener 122 may be screw, nail, rivet, or other suitable device that provides a mechanically fastens components together. A mechanical fastener 122 is not, for example, an adhesive, a weld, or another similar joining material or process.

In exemplary embodiments, the mechanical fastener 122 of each connection device 120 extends through the root 34. A hole 124 may thus be defined in the root 34 for each mechanical fastener 122, which the associated mechanical fastener 122 may extend through. The mechanical fastener 122 may further be generally aligned in the span-wise direction, such that a longitudinal axis of the mechanical fastener 122 is aligned with a span-wise axis. Thus, the mechanical fastener 122 may extend through the root 34 in the generally span-wise direction.

The mechanical fastener 122 of each connection device 120 may further connect the rotor blade 16 to the hub 18. As shown, for example, the mechanical fastener 122 may extend through the hub 18. Thus, each connection device 120 according to the present disclosure may advantageously connect the blade extension 110 to the rotor blade 16 while also connecting the rotor blade 16 to the hub 18.

In some embodiments, as shown for example in FIG. 4, the blade extension 110 further includes a projection 130. The projection 130 extends the blade extension 110 in the generally span-wise direction from the root 34 away from the tip 32. Further, the projection 130 may extend over and cover the root 34 or a portion thereof, and thus contact the root 34. The projection 130 may thus be between and in contact with the hub 18 and root 34 when the rotor blade 16 is connected to the hub 18.

As further shown in FIG. 4, the mechanical fastener 122 of one or more of the connection devices 120 may further extend through the projection 130, such as in the span-wise direction as discussed above. Thus, a hole 132 may be defined through the projection 130 for each associated mechanical fastener 122. As discussed above, the mechanical fastener 122 may then be connected to the hub 18. Thus, the projection 130 may be disposed between and in contact with the root 34 and hub 18, and the mechanical fasteners 122 of each connection device 120 may connect the rotor blade 16, blade extension 110, and hub 18 together.

In other embodiments, as shown in FIG. 5, one or more connection devices 120 according to the present disclosure may include a barrel nut 140 and an auxiliary mechanical fastener 142. The barrel nut 140 is disposed within the rotor blade 16, in the interior of the rotor blade 16 as shown. The mechanical fastener 122 of the connection device 120 may extend within the rotor blade 16 to the barrel nut 140, and be connected to the barrel nut 140. The auxiliary mechanical fastener 142 is connected to the barrel nut 140, and extends from the barrel nut 140. The auxiliary mechanical fastener 142 extends from the barrel nut 140 at an angle to the mechanical fastener 122, such as in some embodiments generally perpendicular to the mechanical fastener 122. Further, the auxiliary mechanical fastener 142 of a connection device 120 may connect the blade extension 110 to the rotor blade 16. For example, the auxiliary mechanical fastener 142 may extend through the rotor blade 16, thus defining a hole 144 in the rotor blade 16 and exterior surface thereof for each associated mechanical fastener 142. The auxiliary mechanical fastener 142 may further extend through the blade extension 110, such as through the interior surface 114 thereof, thus defining a hole 146 in the blade extension 110 and interior surface 114 thereof for each associated mechanical fastener 142. The auxiliary mechanical fastener 142 may thus connect the blade extension 110 to the rotor blade 16. The rotor blade 16 may be connected to the hub 18 by the mechanical fastener 122 of the connection device 120, and the root 34 may be in direct contact with hub 18, as shown in FIG. 5, or a projection 130 of the blade extension may be disposed between an in contact with the hub 18 and mechanical fastener 122.

A connection device 120 according to the present disclosure may further include one or more nuts 150 and/or washers (not shown) or other suitable mating connection apparatus. The mating connection apparatus may mate with the mechanical fasteners 122 to secure the connections between the rotor blade 16 and blade extension 110, as well as between the rotor blade 16 and hub 18. For example, as shown in FIGS. 4 and 5, nuts 150 may mate with the mechanical fasteners 122, which in these embodiments are bolts, to secure the connections between the rotor blade 16 and blade extension 110, as well as between the rotor blade 16 and hub 18.

In some embodiments, the connection devices 120 and blade extensions 110 may each have various "poka-yoke" features, also known as "fool-proofing", "dummy-proofing", or "Murphy proofing" features. These features may in exemplary embodiments allow for the proper alignment of the blade extension 110 and the rotor blade 16, so that for example the aerodynamic contour of the blade extension 110 corresponds with the aerodynamic profile of the rotor blade 16. Such poka-yoke features may include, for example, different spacing, sizing, shapes, or colors between various of the connection features 120 and between the holes 132 in the projection and/or holes 146 in the interior surface 114. Thus, proper alignment can be generally assured when all required connection features 120, and mechanical fasteners 122 and/or auxiliary mechanical fasteners 142 thereof, properly match with and extend through all required holes 132 and/or 146.

As discussed above, in some embodiments, a blade extension 110 may be connected to a rotor blade 16 to form a rotor blade assembly 100 after the rotor is mounted on the tower 12. In other embodiments, the blade extension 110 may be connected to the rotor blade 16 before the rotor is mounted on the tower 12. The present disclosure is thus further directed to a method of installing a rotor blade assembly 100 on a wind turbine 10. The method may include, for example, erecting a tower 12 and mounting a rotor on the tower 12. An exemplary erected tower 12 and rotor including rotor blades 16 and a hub 18 are shown in FIG. 1. The tower 12 may be erected using any suitable erection methods and apparatus. For example, in some embodiments, one or more cranes may be utilized to lift the tower 12, or segments thereof, into place to erect the tower 12. Further, the rotor may be mounted on the tower 12 using any suitable erection methods and apparatus. For example, in some embodiments, one or more cranes may be utilized to lift the rotor, or components thereof, into place to mount the rotor on the tower 12.

The method according to the present disclosure further includes connecting one or more blade extensions 110 to one or more rotor blades 16. A blade extension 110 is connected to a rotor blade 16 using connection devices 120, as discussed above.

In exemplary embodiments, the connecting step occurs after the mounting step. In these embodiments, a blade extension 110 is thus connected to a rotor blade 16 after the rotor blade 16 is mounted on the tower 12. For example, in some of these embodiments, a blade extension 110 may be retrofitted to a rotor blade 16 of an existing wind turbine 10. In other embodiments, however, the connecting step may occur before the mounting step. In these embodiments, a blade extension 110 is thus connected to a rotor blade 16 before the rotor blade 16 is mounted to the tower 12. The rotor, and rotor blades 16 and rotor blade assemblies 100 thereof, may then be mounted to the tower 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:
   a rotor blade having exterior surfaces defining an aerodynamic profile comprising a pressure side and a suction side extending between a leading edge and a trailing edge, the rotor blade further extending in a generally span-wise direction between a root and a tip;
   a blade extension extending in the generally span-wise direction from the root towards the tip;
   a plurality of connection devices connecting the blade extension to the rotor blade, each of the plurality of connection devices comprising a mechanical fastener extending through the root in the generally span-wise direction for connecting the rotor blade to a hub of the wind turbine.

2. The rotor blade assembly of claim 1, wherein the blade extension comprises a projection extending from the root away from the tip in the generally span-wise direction, the projection further contacting the root.

3. The rotor blade assembly of claim 2, wherein a mechanical fastener of at least one of the plurality of connection devices extends through the projection and connects the blade extension to the rotor blade.

4. The rotor blade assembly of claim 1, wherein at least one of the plurality of connection devices further comprises a barrel nut disposed within the rotor blade and an auxiliary mechanical fastener extending from the barrel nut and connecting the blade extension to the rotor blade.

5. The rotor blade assembly of claim 4, wherein the mechanical fastener of the at least one of the plurality of connection devices extends from the barrel nut of that connection device.

6. The rotor blade assembly of claim 1, wherein at least one of the plurality of connection devices further comprises a nut mated to the mechanical fastener for connecting the blade extension to the rotor blade.

7. The rotor blade assembly of claim 1, wherein the blade extension comprises an interior surface and an exterior surface, the interior surface of the blade extension corresponding to an exterior surface of the rotor blade, the exterior surface of the blade extension having an aerodynamic contour that corresponds to the aerodynamic profile of the rotor blade.

8. The rotor blade assembly of claim 7, wherein the exterior surface of the blade extension further defines the leading edge.

9. The rotor blade assembly of claim 7, wherein the exterior surface of the blade extension further defines the trailing edge.

10. A wind turbine, comprising:
    a hub;
    a plurality of rotor blades, each of the plurality of rotor blades connected to the hub and having exterior surfaces defining an aerodynamic profile comprising a pressure side and a suction side extending between a leading edge and a trailing edge, each of the plurality of rotor blades further extending in a generally span-wise direction between a root and a tip;
    a blade extension extending in the generally span-wise direction from the root towards the tip of at least one of the plurality of rotor blades;
    a plurality of connection devices connecting the blade extension to the one of the plurality of rotor blades, each of the plurality of connection devices comprising a mechanical fastener extending through the root in the generally span-wise direction, the mechanical fastener further connecting the one of the plurality of rotor blades to the hub.

11. The wind turbine of claim 10, wherein the blade extension comprises a projection extending from the root away from the tip in the generally span-wise direction, the projection further contacting the root.

12. The wind turbine of claim 11, wherein a mechanical fastener of at least one of the plurality of connection devices extends through the projection and connects the blade extension to the rotor blade.

13. The wind turbine of claim 10, wherein at least one of the plurality of connection devices further comprises a barrel nut disposed within the rotor blade and an auxiliary mechanical fastener extending from the barrel nut and connecting the blade extension to the rotor blade.

14. The wind turbine of claim 13, wherein the mechanical fastener of the at least one of the plurality of connection devices extends from the barrel nut of that connection device.

15. The wind turbine of claim 10, wherein at least one of the plurality of connection devices further comprises a nut mated to the mechanical fastener for connecting the blade extension to the rotor blade.

16. The wind turbine of claim 10, wherein the blade extension comprises an interior surface and an exterior surface, the interior surface of the blade extension corresponding to an exterior surface of the rotor blade, the exterior surface of the blade extension having an aerodynamic contour that corresponds to the aerodynamic profile of the rotor blade.

17. The wind turbine of claim 16, wherein the exterior surface of the blade extension further defines the leading edge.

18. The wind turbine of claim 16, wherein the exterior surface of the blade extension further defines the trailing edge.

19. A method of installing a rotor blade assembly on a wind turbine, comprising:
connecting a blade extension to a rotor blade, the rotor blade extending in a generally span-wise direction between a root and a tip, wherein a plurality of connection devices are utilized to connect the blade extension to the rotor blade, each of the plurality of connection devices comprising a mechanical fastener configured to extend through the root in the generally span-wise direction, the mechanical fastener connecting the rotor blade to a hub of the wind turbine.

20. The method of claim 19, wherein the connecting step occurs after a rotor is mounted on a tower of the wind turbine, the rotor comprising the rotor blade and the hub.

* * * * *